US006615466B1

United States Patent
Sahm et al.

(10) Patent No.: US 6,615,466 B1
(45) Date of Patent: Sep. 9, 2003

(54) TOOL HEAD WITH SPINDLE BEARING ARRANGEMENT

(75) Inventors: Detlef Dieter Sahm, Lichtenwald (DE); Jochen Dieringer, Hechingen-Stetten (DE); Michael Eberle, Dettingen (DE)

(73) Assignee: Sauter Feinmechanik GmbH, Metzingen (DE)

(*) Notice: Subject to any disclaimer, the term of this patent is extended or adjusted under 35 U.S.C. 154(b) by 0 days.

(21) Appl. No.: 09/831,523

(22) PCT Filed: Oct. 20, 1999

(86) PCT No.: PCT/EP99/07945

§ 371 (c)(1), (2), (4) Date: Aug. 7, 2001

(87) PCT Pub. No.: WO00/27579

PCT Pub. Date: May 18, 2000

(30) Foreign Application Priority Data

Nov. 11, 1998 (DE) .......................................... 198 52 049

(51) Int. Cl.⁷ .............................. B23Q 5/54; B23C 1/00
(52) U.S. Cl. ........................ 29/56.5; 409/231; 409/215; 409/230
(58) Field of Search .................... 29/56.5; 409/231, 409/215, 230

(56) References Cited

U.S. PATENT DOCUMENTS

| | | | |
|---|---|---|---|
| 4,008,646 A | * 2/1977 | Hague et al. | 29/26 A |
| 4,519,734 A | * 5/1985 | Mitchell et al. | 409/231 |
| 4,570,313 A | * 2/1986 | Holmstrom et al. | 29/26 A |
| 4,856,153 A | 8/1989 | Gusching | |
| 4,884,481 A | * 12/1989 | Strauss | 82/1.2 |
| 4,958,967 A | * 9/1990 | Adachi | 409/231 |
| 5,322,494 A | * 6/1994 | Holtey et al. | 409/231 |
| 6,216,798 B1 | * 4/2001 | Riello et al. | 409/231 |

FOREIGN PATENT DOCUMENTS

| | | |
|---|---|---|
| DE | 33 45 414 C 1 | 2/1985 |
| DE | 34 36 938 C 1 | 10/1985 |
| DE | 35 29 481 A 1 | 2/1987 |
| DE | 39 13 139 A 1 | 11/1989 |
| DE | 39 30 154 A 1 | 3/1991 |
| EP | 0 259 517 A 1 | 3/1988 |

* cited by examiner

Primary Examiner—A. L. Wellington
Assistant Examiner—Dana Ross

(57) ABSTRACT

The invention relates to a tool head with a spindle bearing arrangement The bearings (9, 10) of said arrangement rest with one of their bearing shells on a driven spindle (2) with a tool holding fixture (1). With their other bearing shell they interact with a housing (8) in such a manner that in at least one part (10) of the bearings (9, 10) the respective other bearing shell interacts with a sliding piece (11) which is slideable along the housing (8) in the one sliding direction and which locks the spindle (2) with the housing (8) in a locking position. In the other sliding direction, said sliding piece releases the spindle in a release position. The invention provides a universally useful tool head by the following configuration: The respective other bearing shell of the one part (10) of the bearings (9, 10) is at least partially enclosed by the sliding piece (11). Said sliding piece (11) is forced into the locking position with a predetermined contact force by a drive device. The sliding piece closely fits the housing (8) when the lock is released. Said tool head can be used for both milling and turning on a lathe. The tool head provides also a means for simultaneously relieving the spindle bearing arrangement when the tool is operated in a nonrotative mode.

11 Claims, 2 Drawing Sheets

TOOL HEAD WITH SPINDLE BEARING ARRANGEMENT

Figure 1:
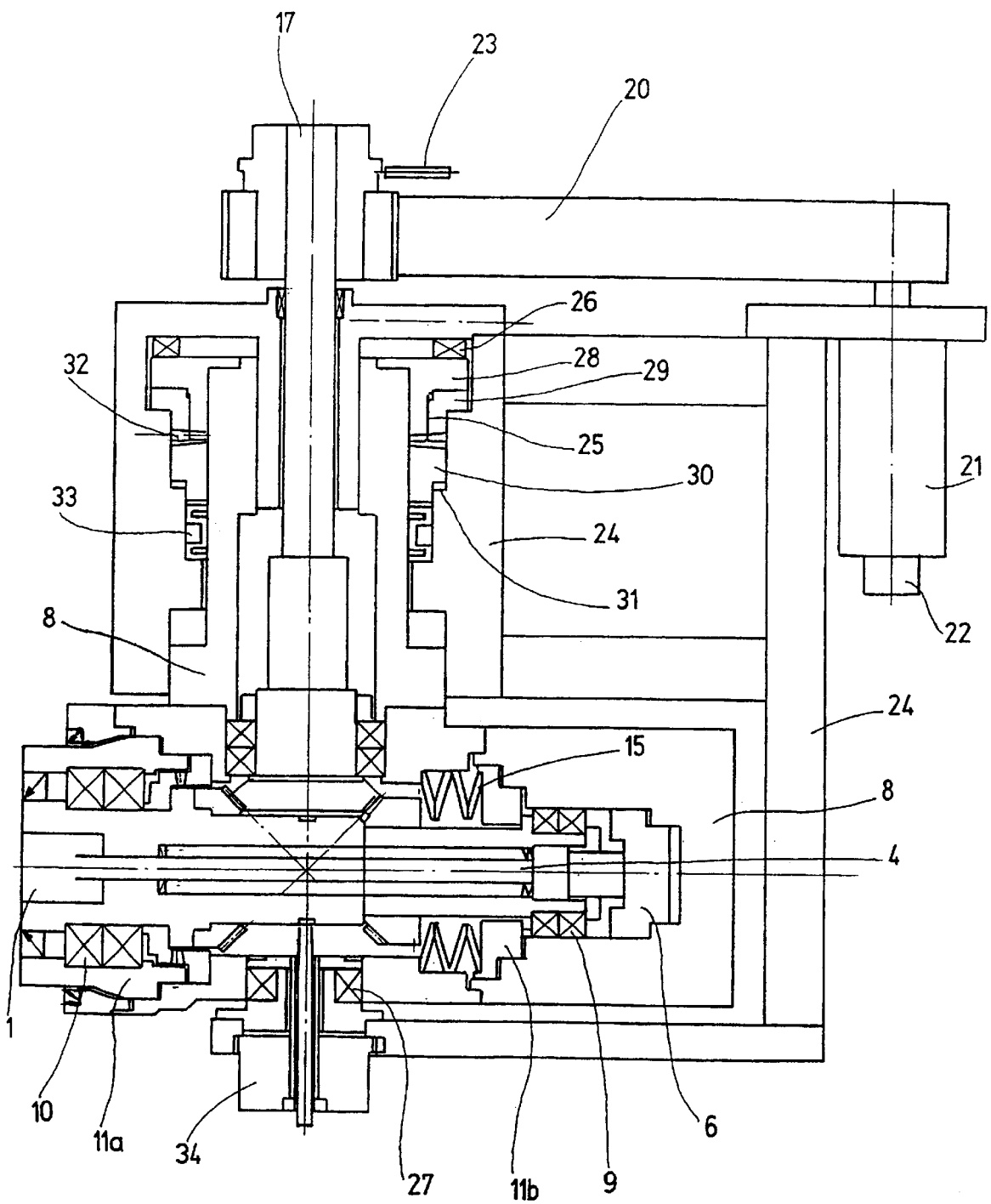

The invention relates to a tool head with spindle bearing arrangement, of which the bearings are supported with one bearing shell on a driven spindle with a tool holder for the driving of a tool and with the other bearing shell cooperating with a housing, whereby at least with one part of the bearing the relevant other bearing shell cooperates with a sliding piece, which can slide along the housing by means of a drive device, in the one sliding direction of which the spindle cooperating with the housing is interlocked therewith by means of a locking mechanism in a locking position for an operation with a stationary tool and in the other sliding direction of which it unlocks in an unlock setting for an operation with a rotating tool.

Comparable tool heads are configured for example as single-spindle tool heads to hold either stationary or rotating tools for rotary or milling operations taking place in manufacturing machinery. Furthermore such tool heads allow for automatic tool exchange. Particularly with rotary processing with a stationary tool, high stresses are generated in the spindle bearing arrangement, which then allow for rotary operation only within predetermined operational limits which are taken in order to avoid damage to the spindle bearing. Furthermore, operations can be realized generally only along a predetermined axis and operations of manufacturing along complicated structural geometric parts are not possible.

Such a tool head with spindle bearing arrangement is already known from DE 39 13 139 C2, in which for an operation with a stationary tool the spindle is locked in relation to the housing through a Hirth-type serration arrangement as locking mechanism. Compression pistons arranged around the exterior periphery of the spindle serve as drive device for the locking, which press an annular gear-tooth system against work surface annular gear-tooth systems of the housing and the spindle. The counter-pressure or reaction resulting from this is passed further to a sliding piece, which is supported on the interior and exterior bearing shells of the spindle bearing arrangement, in order in that manner in the interlocked or stopped position to avoid any axial play in the bearings by pressure forces being applied. With this known solution then the bearings of the spindle are interlocked for an operation with a stationary tool and the bearings because of that interlocking are being stressed. From a microscopic point of view, this leads with its sort of friction or diffusion welding to destruction of the bearings with reduction of the life of the tool head.

Starting from this state of the art the object of the invention is to disclose a universally useful tool head in comparison with the present state of the art, with which both milling and also rotary operation is possible with simultaneous unlocking of the spindle bearing arrangement when the stationary tool is used. Such an object is disclosed in the tool head having the features disclosed in claim 1.

Owing to the fact that according to the characterizing part of claim 1 the relevant other bearing shell of the one part of the bearing is enclosed at least partially by a sliding piece and that in either the locking or the unlocked position the sliding piece produces both the locking and unlocking by means of the drive device with a predetermined contact force, or when the stop mechanism is unlocked it engages on the housing, an effective relief of the bearing can be attained in the locked position with locking of the spindle, so that the operational limits in the stress-generating operation, particularly with stationary tool, can be carried further than with the known operation systems.

With the arrangement according to the invention during an operation with rotating tool, the sliding piece which surrounds the relevant part of the bearing for the spindle is interlocked by the force of the drive device against the housing and the flux of force is drained away from the spindle over the spindle bearing and into the housing by means of the sliding piece. When this occurs, the spindle bearing arrangement is highly stressed, which however is not important, since it is laid out analytically and of construction intended for just such a rotary or revolving operation. If processing is taking place with a stationary tool, for example for a rotary operation, the spindle preferably is provided, by means of the locking mechanism, with a Hirth-type serration arrangement, is tightly connected with the housing, and the sliding piece is mounted essentially free of forces and freely movable in the housing between stops. Since the sliding piece surrounds and encloses the relevant bearing on the associated bearing shell, such a bearing and bearing shell are also held free of forces and an application of potentially damaging force within the spindle bearing arrangement during operation with a stationary tool does not take place. This leads to a remarkable increase in the life of the tool head.

With one particularly preferred embodiment of the tool head of the invention, the sliding piece is formed of two separate sliding pistons which are slidable as drive device by means of fluid pressure in either one of the two sliding directions and can be returned in the relevant other sliding direction by means of an accumulator arrangement. By distribution of the function for the sliding piece into two component parts in the form of two sliding pistons, the described unlocking device can be mounted within the tool head directly in the area of the spindle, which conserves space.

In the case of another particularly preferred embodiment of the tool head of the invention, the one part of the bearing is arranged between the tool holder and the locking mechanism. With the known solutions (DE 39 13 139 C2) the arrangement is such that the locking mechanism in the form of the Hirth-type serrations is arranged between the tool holder and the spindle bearing arrangement. On the other hand, with the arrangement according to the invention, a rigid construction of the tool system becomes possible which enhances the operational qualitites especially with an operation using a stationary tool.

With another preferred embodiment of the tool head of the invention, the spindle is guided in the area of both of its ends rotatably in bearings, whereby the relevant bearings are arranged at the ends of the spindle lying adjacent to the tool holder, each with its relevant other bearing shell longitudinally slidable along the housing. Preferably it is thus provided that a gear-tooth system serves as locking mechanism for the locking of the spindle with the housing, and for the unlocking of the spindle the sliding piece can be moved into the center of the housing. Then on the one hand a secure locking is attained and on the other hand with the centering a certain and precise movement of the sliding piece between its end stops is attained.

In the case of another particularly preferred embodiment of the tool head of the invention, when the sliding piece is in locked position, the spindle is brought by the sliding piece into engagement with a drive shaft in interlocking position in such a manner that during its rotary movement the housing becomes pivotal with the spindle in predetermined positions. Preferably then the drive shaft is provided for the driving of the spindle carrying its tool, which drive shaft is connected with the spindle by means of a gear-tooth system, which in diametric opposition to one another alternately facilitates the locking and the driving of the spindle.

The tool head of the invention is designed in such a manner that it can be pivoted perpendicular to the rotary axis of the tool holder, in order thus to facilitate any operation with the tool in the desired linear path directions.

Insofar as an independent drive mechanism is provided in one preferred embodiment in order to hold the aforementioned drive shaft, then the pivot movement and the rotation of the tool holder can be embodied independently from one another, in order in such a manner to execute the most complex three-dimensional path geometries during the operation.

Other advantageous embodiments of the tool head are the object of the dependent claims.

Hereinafter the tool head of the invention is to be described in greater detail relative to the drawing.

Figure 2:
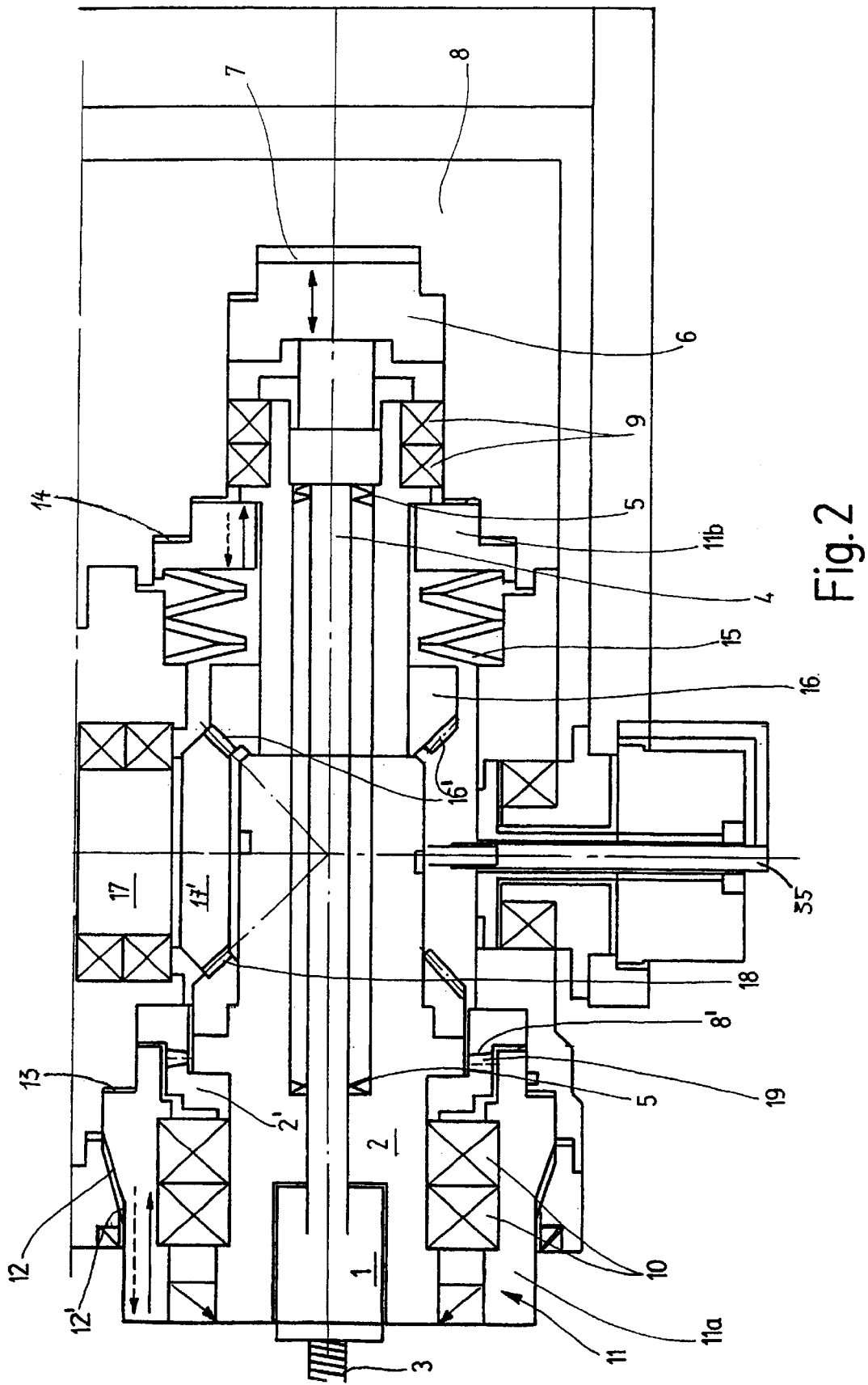

In the drawing, the following are shown in outline and not necessarily in representation in the proper scale:

FIG. 1 the total arrangement of the tool head;

FIG. 2 an enlarged representation of the spindle bearing arrangement shown in FIG. 1.

A tool holder 1 is integrated into the spindle 2. The only partially represented tool 3 is tightened in place by means of a connecting rod 4, which is guided longitudinally slidably along the longitudinal or rotary axis of spindle 2 and is enclosed radially within a set of only partially represented disk springs 5, whereby the set of springs is supported with its one end more closely adjacent to the tool holder 1 on an interior recess of spindle 2 and on its other opposite end on a flange-like broadened-out area of connecting rod 4. The unlocking of tool 3 is accomplished hydraulically in turn by means of connecting rod 4 working with the cooperation of the hydraulic piston 6, which by means of fluid pressure in the work chamber 7 is activated counter to the effect of the accumulator arrangement in the form of the set of disk springs 5 by thrusting connecting rod 4 together with tool holder 1 as though toward the left in the viewing direction when looking at the drawing. The aforementioned work chamber 7 is limited on the one hand on the working side of the hydraulic piston 6 and thus by the housing 8 of the tool head. Connecting rod 4 the same as hydraulic piston 6 can be embodied with auxiliary channels which are not shown, in order for example to carry coolant lubricant coming from housing 8 on as far as tool 3. The possible directions of movement of hydraulic piston 6 together with connecting rod 4 and tool holder 1 are shown with a double arrow.

Spindle 2 can likewise be penetrated or grooves, which is not shown, for the transmission of auxiliary sources of power or the like in longitudinal direction. For this purpose, spindle 2 is mounted to be rotatable within housing 8, which is accomplished over bearings 9 and 10. Bearings 9 are guided translation-like over their exterior bearing shell longitudinally movably into the recess of housing 8, in which the hydraulic piston 6 is also arranged movably translation-like. The interior bearing shell of that bearing 9 is supported on spindle 2 and is limited on the border by spindle 2 (cf. FIG. 2). Both bearings 10 arranged in the area of tool holder 1 are supported by means of their interior bearing shells on spindle 2 and are limited by this supporting border, and in turn their exterior bearing shells are held in a sliding piece indicated in its entirety with reference 11.

The sliding piece indicated in its entirety as 11 consists essentially of two sliding pistons 11a, 11b, separated from one another with some space between them, whereby sliding piston 11a more closely adjacent to tool holder 1 is configured as a sort of spindle sleeve, in which spindle 2 is guided rotatably over bearings 10. Front sliding piston 11a includes a taper sleeve 12 on its exterior periphery as sliding piece 11, which cooperates with a correspondingly constructed interior taper sleeve 12' of housing 8. In order to move taper sleeve 12 according to the drawing in FIG. 2 into pressure-exerting contact with interior taper sleeve 12' of housing 8 along the sliding direction shown with broken line, sliding piston 11a is contacted on its side more distant from tool holder 1 with a fluid or hydraulic pressure in the fluid chamber 13 serving as driving device. Parallel to this and simultaneously the other sliding piston 12b is moved by means of a corresponding fluid pressure in chamber 14 in the sliding direction shown by the arrow with a broken line, and thus counter to the effect of another accumulator in the form of part of the drive device in the form of the set of disk springs 15, which is supported with its one end on housing 8 and at its other end is supported on the working side of sliding piston 11b arranged opposite chamber 14. Because of the fluid pressure applied in such a manner, taper sleeve 12 comes in contact with interior taper sleeve 12' and sliding piston 11a, and as part of the sliding piece 11 carries spindle 2 with it over the bearing 10 at the same time in a predetermined path in the direction shown with a broken line. With such a sliding movement, spindle 2 also carries bearing 9 translation-like in the sliding direction along with it and also simultaneously carries along the connecting rod 4. The bearing points relating to bearings 10 as well as taper sleeve 12 are sealed outwardly in the conventional manner.

On its exterior peripheral side spindle 2 has a bevel gear 16, which with its gear-tooth system 16' is in engagement with a corresponding gear-tooth system 17' of a drive shaft 17, which over corresponding bearings is guided rotatably in housing 8 in a conventional manner and thus not to be described in greater detail. Diametrically opposite the engagement point of the two gear-tooth systems of spindle 2 and drive shaft 17 is located a locking gear-tooth system 18 on spindle 2, which in terms of its gear-tooth flanks has an inclination corresponding to that of the bevel gear gear-tooth system 16'. The possible sliding path of spindle 2 is thus designed in such a manner that in the direction of the sliding position shown in broken line the gear-tooth systems 17' and 18 are in engagement or else on the other hand, in the sliding position represented with a full line, gear-tooth systems 17' and 16' are in engagement, and the gear-tooth systems 17' and 18 thus come out of engagement. Bevel gear 16 and locking gear-tooth system 18 are thus tightly connected with the independent spindle 2.

Furthermore, spindle 2 has an exterior peripheral annular gear-tooth system 2', which is connected tightly with spindle 2. Annular gear-tooth system 2' has as one part a Hirth-type serration arrangement 19 serving as locking mechanism, and the other series of gear-tooth systems are formed by an annular gear-tooth system 8', whereby annular gear-tooth system 8' is in turn connected tightly with housing 8. In the sliding direction represented by broken line on sliding piece 11, the resulting Hirth-type serration system 19 together with locking gear-tooth system 18 comes out of this engagement and into engagement in the sliding direction running in the opposite direction represented with a solid line, whereby the gear-tooth system 16' of either the drive gear or the bevel gear comes out of engagement. As shown particularly in FIG. 1, drive shaft 17 is driven with the bevel gear gear-tooth system associated with it by means of a belt drive 20 as well as a geared electric motor 21, provided with a lathe 22. A switch-control device 23 serves for detection of the rotary position of drive shaft 17, in case the translation of the aforementioned belt drive is to be something other than 11.

Furthermore, drive shaft 17 is mounted to rotate over corresponding traditional bearing points in housing 8 as well as in another housing 24. Housings 8 and 24 are mounted to be able to rotate relative to one another over the bearing points 25, 26 and 27. In predeterminable rotary bearings, housings 8 and 24 are fixed relative to one another over the three-part Hirth-type serration arrangement 28, 29, 30, and the fluid chamber 31 is actuated with pressure and the annular gear-tooth system 30 can engage in the gear-tooth systems 28, 29. If said housings 8 and 24 are to be fixed in corresponding rotary positions in which the gear-tooth systems of the Hirth-type serrations 28, 29, 30 do not properly correspond, then in terms of obtaining a fine adjustment the fluid chamber 32 can be actuated with hydraulic pressure, whereby then the annular gear-tooth system 30 of the Hirth-type serration system operates the clamping bushing 33 as a hydraulic piston, and it radially enlarges or expands this bushing between housings 8 and 24. The possible pivot movement of housings 8 and 24 relative to one another is recorded through an angular position transmitter 34, whereby the proximity switch 35 fastened on the bottom of housing 24 serves with it for lifting and rotation settings controls of spindle 2. In order to obtain a definite fixing of sliding piece 11 relative to housing 8, instead of taper sleeve 12, 12' a corresponding Hirth-type serration system not to be described in greater detail can be provided in this area between the frontal sliding piece 11 and the associated housing 8.

For better understanding of the tool head of the invention, it will henceforth be explained in greater detail relative to various processes of operation.

For a tool exchange, preferably to be carried out automatically, first of all housing 8 is to be affixed to housing 24 with a certain pivotal positioning. Spindle 2 is then thrust by means of fluid chambers 13, 14 and the associated sliding pistons 11a, 11b into interior taper sleeve 12' of housing 8 and is held in a certain rotational position by means of the motor 21.

For unlocking of the tool after use, with the aid of the hydraulic pressure in work chamber 7, connecting rod 4 is moved by means of hydraulic piston 6 in the direction of interior taper sleeve 12', whereby it is biased by the set of disk springs 5. The tool can then be removed by an external changing mechanism in the conventional manner and can be exchanged for another tool. Then, for biasing of this tool, work chamber 7 is connected without pressure, so that the set of disk springs 5 can be relieved, whereby connecting rod 4 draws tool 3 into tool holder 1. The prebiasing force of the set of disk springs 5 then holds tool 3 in holder 1.

For a pivotal movement of spindle 2 with its spindle bearing, fluid chambers 13, 14 are connected without pressure, so that over the set of disk springs 15 the Hirth-type serrations 19 are conditionally locked and the interlocking connection between drive shaft 17 and spindle 2 is produced by means of interlocking gear-tooth system 18. Housing 8 is pivoted by subsequent rotation of drive shaft 17 by means of motor 21, since spindle 2 is connected through the Hirth-type serrations 19 with housing 8. The resulting rotary movement can be monitored with the angular position transmitter 34 found in the control arrangement. When the predetermined pivot position has been reached, housing 8 then with the aid of the other Hirth-type serrations 28 to 30 as well as fluid chamber systems 31, 32 and the clamping bushing 33 is affixed in relation to housing 24.

In order to work with a stationary tool in the sense of a rotary or lathe operation, housings 8 and 24 are fixed counter to one another in their positions. Fluid chambers 13 and 14 are in turn connected without pressure, so that the Hirth-type serration system 19 is in its effectively locked position. Spindle 2 is then connected as a result over the annular gear-tooth assemblies 2' and 8' in form-looking connection with housing 8. Under the influence of the set of disk springs 15 in the sliding direction represented as an arrow in solid line the frontal sliding piston 11a with its taper sleeve 12 is thrust out of interior taper sleeve 12' of housing 8 and bearings 10 are relieved as a result. The force of the operation is henceforth transferred from tool 3 directly over spindle 2 onto housing 8.

In order to work with rotating tool, in other words for a milling process, housings 8 and 24 are in turn fixed in their positions counter to one another. Under the fluid pressure in chambers 13, 14, spindle 2 is then thrust in the direction of the broken-line arrow over taper sleeve 12 into the interior taper sleeve 12, whereby the flux of force from tool 3 is then produced over spindle 2, bearings 10 and over the frontal sliding piston 11a in housing 8. The Hirth-type serration system 19 is then unlocked and likewise the interlocking gear-tooth system 18. Spindle 2 can then be driven by means of the bevel gear gear-tooth system 16' by means of drive shaft 17 as well as belt drive 20 and motor 21. Taper sleeve parts 12 and 12' can if necessary have gear-tooth assemblies to secure them from rotation, especially a Hirth-type serration system, as torque protection.

Both a rotary operation and also a milling operation can be realized alternately with the tool head of the invention, whereby an effective relief of the bearing is obtained with the rotary operation. Furthermore the housing parts of the tool head can be pivoted relative to one another.

What is claimed is:

1. A tool head, comprising
  a housing;
  a tool holder located in said housing;
  a driven spindle located in said housing and coupled to said tool holder for driving said tool holder;
  first and second bearings with inner and outer bearing shells, said inner bearing shells being connected to said spindle;
  a sliding piece mounted in said housing and connected to and cooperating with said outer bearing shells, said sliding piece at least partially enclosing said outer shell of said first bearing, said sliding piece including front and back sliding pistons, each of said sliding pistons being slidable in two opposite directions and biased by an accumulator in one of said two opposite directions, said front sliding piston being adjacent said tool holder and being a spindle sleeve, said back sliding piston being held in a locked state in contact with said spindle; and
  a drive coupled to said sliding piece for sliding said sliding piece in one direction to a locked position in which said spindle interlocks with said housing by a locking mechanism for operating a stationary tool and in an opposite direction to an unlocked position releasing the spindle for operating a rotating tool, said sliding piece forming a stop in said locked and unlocked positions with said drive having a predeterminable contact force and engaging said housing when said stop is released.

2. A tool head according to claim 1 wherein
  said drive sliding said front and back sliding pistons of said slidable piece comprise fluid pressure drives.

3. A tool head according to claim 1, wherein
  said first bearing is arranged between said tool holder and said locking mechanism.

4. A tool head according to claim 1 wherein said spindle is rotatable adjacent longitudinal ends thereof in said first and second bearings, said second bearing being arranged remote from said tool holder and having said outer bearing shell thereof longitudinally slidable along said housing.

5. A tool head according to claim 1 wherein said locking mechanism comprises a Hirth-type serration arrangement; and said sliding piece moves into a center of said housing for unlocking said spindle relative to said housing.

6. A tool head according to claim 1 wherein said spindle is non-rotatable relative to said housing when locked.

7. A tool head according to claim 2 wherein said accumulator for said back sliding piston comprises a set of disk springs biasing said back sliding piston in said locked state.

8. A tool head according to claim 7 wherein said front sliding piston comprises a tapered sleeve for contacting an interior tapered sleeve on said housing.

9. A tool head according co claim 1 wherein said sliding piece engages said spindle in said locked position with a drive shaft for pivoting said housing with said spindle into predetermined angular settings.

10. A tool head according to claim 9 wherein said drive shaft is connected with and drives said spindle with said tool holder through a gear-tooth system facilitating diametrically opposite locking and driving of said spindle.

11. A tool head according to claim 9, wherein said drive shaft and said spindle have longitudinal axes which are perpendicular to one another.

* * * * *